March 29, 1966  G. E. SWICK, JR  3,243,015
VEHICLE LIFT ADAPTER
Filed Oct. 7, 1963  4 Sheets-Sheet 1

INVENTOR.
George E. Swick, Jr.
BY
Dale A. Winnie
ATTORNEY

March 29, 1966  G. E. SWICK, JR  3,243,015
VEHICLE LIFT ADAPTER
Filed Oct. 7, 1963  4 Sheets-Sheet 2

INVENTOR.
George E. Swick, Jr.
BY Dale A. Winnie
ATTORNEY

March 29, 1966   G. E. SWICK, JR   3,243,015
VEHICLE LIFT ADAPTER
Filed Oct. 7, 1963   4 Sheets-Sheet 3

INVENTOR.
George E. Swick, Jr.
BY
Dale A. Winnie
ATTORNEY

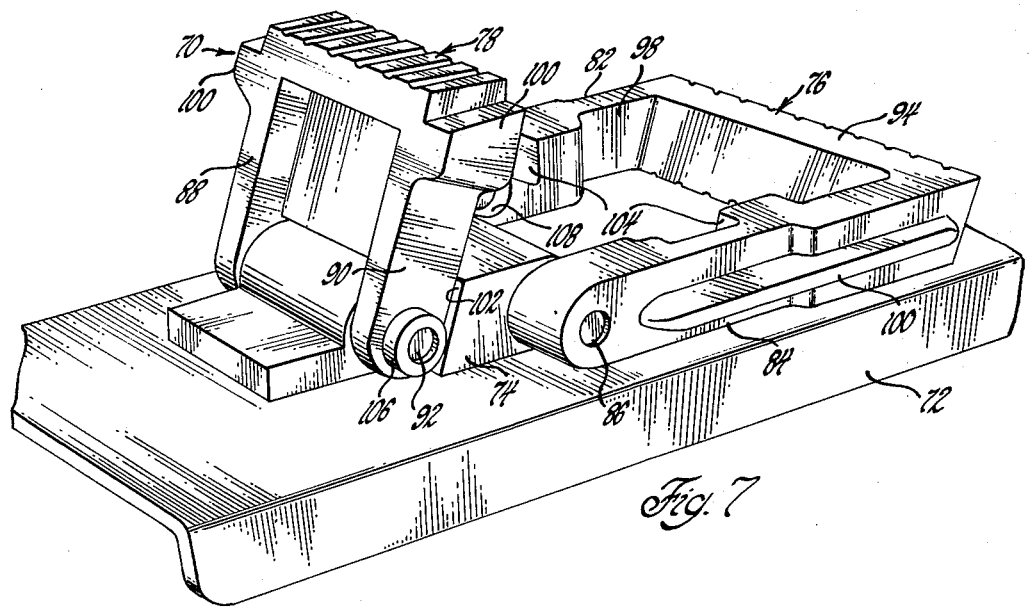
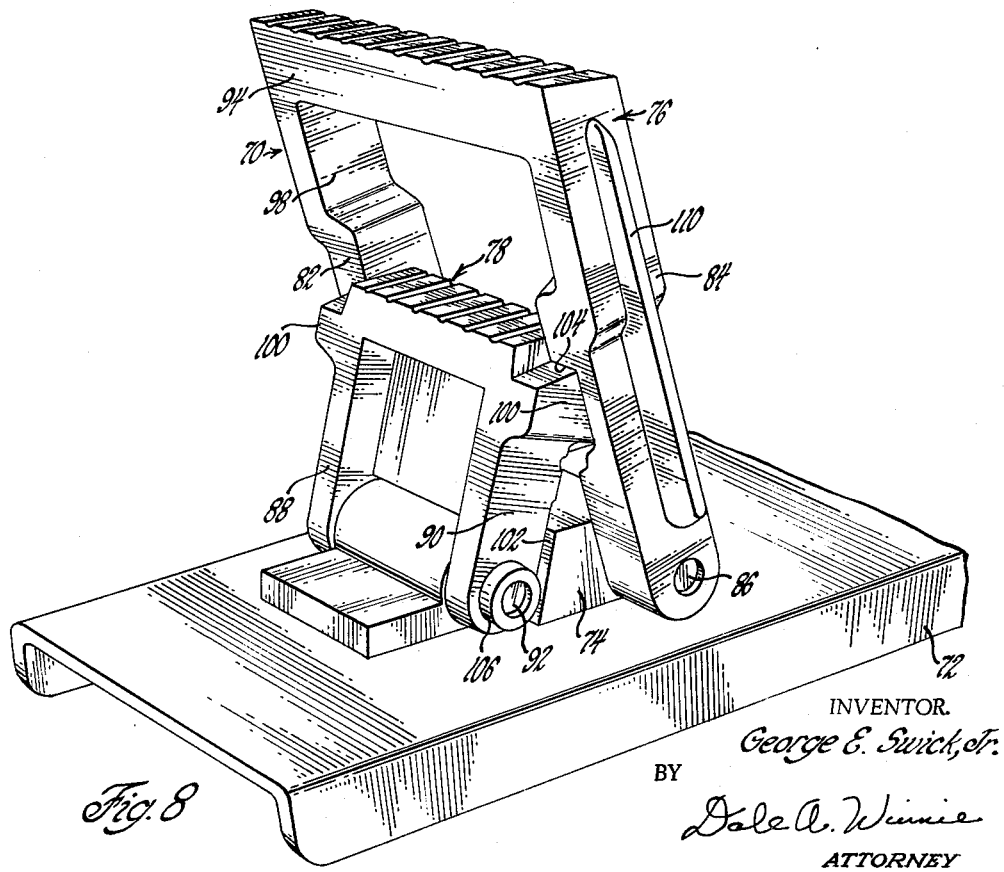

United States Patent Office 3,243,015
Patented Mar. 29, 1966

3,243,015
VEHICLE LIFT ADAPTER
George E. Swick, Jr., Springfield, Ill., assignor to Dura Corporation, Oak Park, Mich., a corporation of Michigan
Filed Oct. 7, 1963, Ser. No. 314,218
14 Claims. (Cl. 187—8.75)

This invention relates to motor vehicle lifts in general and more particularly to adapters for use with lifts which are engaged to the undercarriage frame of a vehicle.

The undercarriage frames of different motor vehicles vary to a considerable extent. Accordingly, most vehicle frame lifts include adjustable arms or the like which eminate from a centrally disposed lift post, or a pair of posts which are adjustable fore and aft, and include support pads on the ends of the arms to accommodate different types of vehicle frames.

Because of the likelihood of obscuring vehicle suspension parts, the exhaust line, transmission, or the like, by a supporting arm required to pass thereunder, it is normal practice to have the support pads on the ends of the lift arms built up to hold the vehicle frame elevated slightly thereover. It has also become normal practice to provide a support pad on the end of the lift arm which is adjustable to different heights to provide even further clearance space.

Quite obviously, since adjustable support pads receive and support the whole weight of a vehicle thereon, they must be exceptionally dependable and sturdy in construction.

It is an object of this invention to provide a lift frame support or adapter which is adjustable to different heights and which is both sturdy in construction and dependable in operation.

It is an object of this invention to provide a simple mechanical type lift frame adapter which includes a minimum of parts, simple to manufacture and assemble and easy to operate.

It is an object of this invention to provide a lift frame adapter which will afford at least three different heights of support and which includes parts which will nest together when not in use for purposes of self storage.

These and other objects and advantages to be gained in the practice of this invention will be better understood and appreciated upon a reading of the following specification in regard to different embodiments of the invention and having reference to the accompanying drawings wherein:

FIGURE 7 is a perspective view of the lift frame adapter shown by FIGURE 6 with the members disposed in intermediate position during manipulation for retaining full height position.

FIGURE 8 is a perspective view of the lift frame adapter shown by FIGURES 4-7 in a full height support position.

Figure 1:
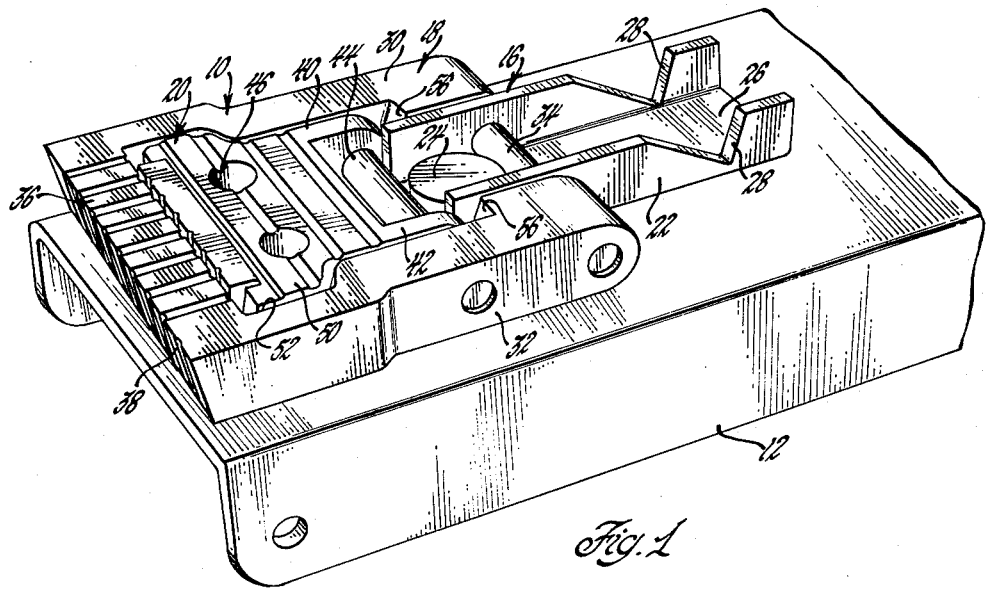
FIGURE 1 is a perspective view of a lift frame adapter embodying certain features of the present invention.
Figure 2:
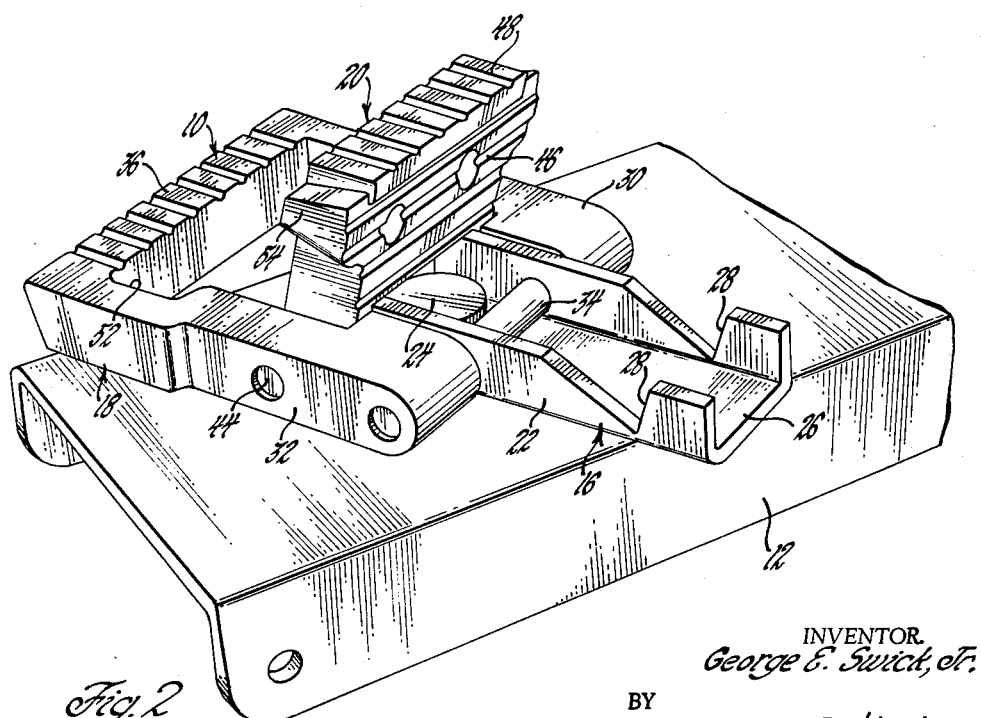
FIGURE 2 is a perspective view of the lift frame adapter of FIGURE 1 shown in a different oriented and intermediate support position.
Figure 3:
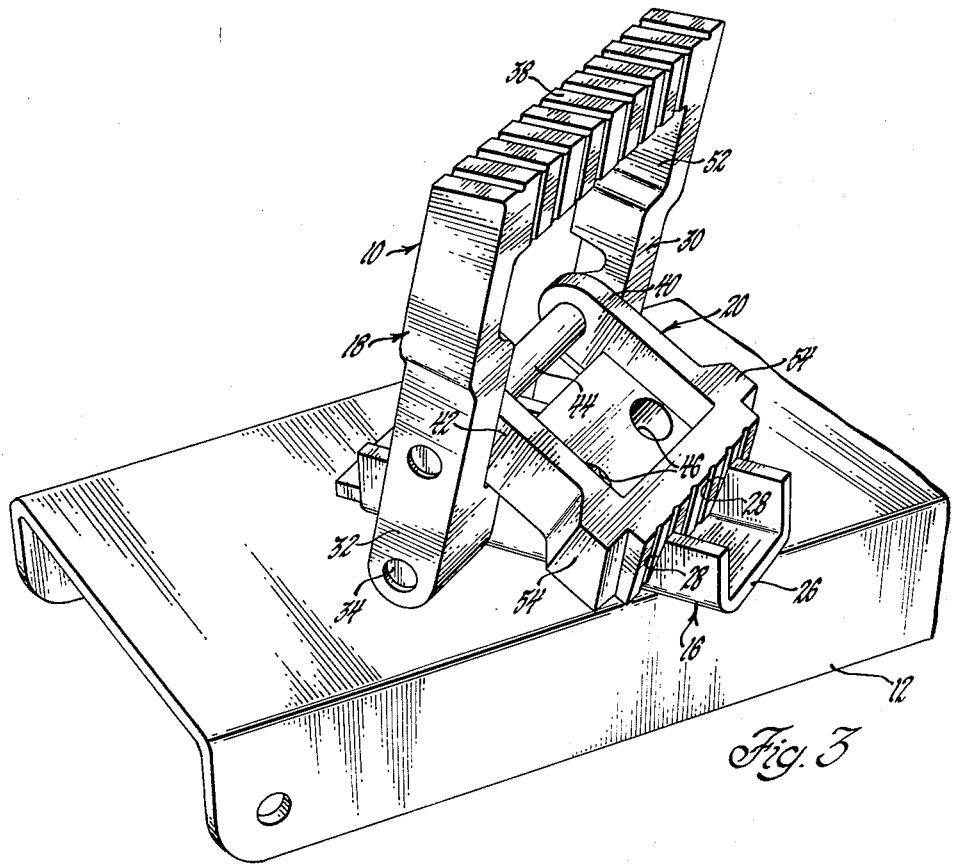
FIGURE 3 is a perspective view of the lift frame adapter shown by FIGURES 1 and 2 in the full height support position.
Figure 4:
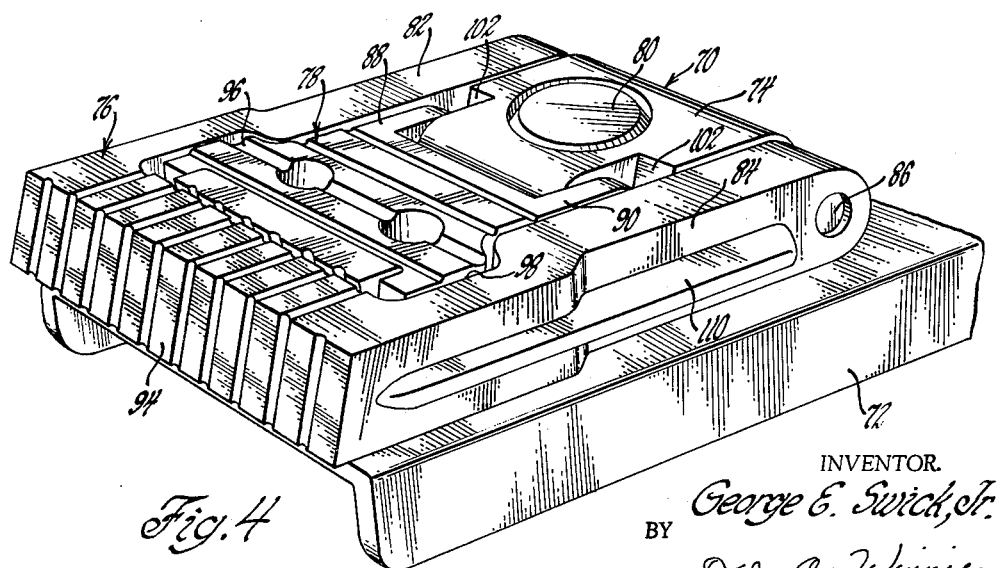
FIGURE 4 is a perspective view of another form of lift frame adapter embodying certain features of the present invention and showing the parts thereof in nested relation.

The lift frame adapter 10 shown by FIGURES 1-3 may be provided on the end of a lift frame support arm 12 or on a base support member which fits thereover and may be extended or retracted as desired.

For the purposes of describing the lift frame adapter 10 the lift support arm 12 will be considered simply as a base support member.

The lift frame adapter 10 includes a swivel block member 16, a bifurcated member 18 which provides full height support, and an intermediate support member 20.

The swivel block member 16 includes a channel shape part 22 which has a pivot pin 24 extended vertically through one end thereof and serves to anchor it to the base support member. It also includes an extended end 26 which has notches 28 near the terminal end thereof for purposes later described.

The bifurcated support member 18 has the forked arms 30 and 32 thereof pinned to the swivel block 16 by a pivot pin 34 which passes laterally therethrough on the extended end of the channel shaped part. The upper disposed side-face of the bridging part 36 of the bifurcated member is scored to provide a friction surface and the terminal end 38 thereof is formed to include a like surface and is cut at a slight angle for reasons later appreciated.

The intermediate support member 20 is nested between the forked arms 30 and 32 of the bifurcated member 18. It is similar in shape to the bifurcated member and has extended arms 40 and 42 which are pivotally pinned to the bifurcated member, between its forced arms, by a laterally disposed pivot pin 44.

The face of the intermediate support member is formed to include a scored surface with holes 46 provided therethrough and has its terminal end 48 cut at an angle in the manner of the bifurcated member last described.

The intermediate support member includes a head 50 which is slightly wider than the rest of it and is received in a receptively wider recess 52 provided in the bifurcated member. By reference to FIGURES 2 and 3 it will also be noted that the head end of the intermediate support member is wider on one side than on the other; thereby providing stop shoulders 54. The recess 52 is cooperatively cut across the end and at the side so that the intermediate member cannot pass through the bifurcated member and will in fact be lifted by the latter through engagement therewith.

The arms of the bifurcated member which are pinned to the swivel block will also be noted to include stop shoulders 56 which are receptive of the arms of the intermediate support member there against in the upright disposition thereof. The arms of the intermediate support member are rounded so that the support member may be pivoted to an upright position and they are also proportioned so that the body part of the support rests on the uprights of the channel section member in the manner of a further shoulder stop.

In the use of the adapter 10, it may be swiveled through a 360° arc and extended or retracted on a support arm if so desired, as previously mentioned.

In the nested relation of the parts shown by parts FIGURE 1 a low height support is provided on the faces of the bifurcated and intermediate support members.

The intermediate support 20 is separately raised by hand or by reach rod engagement in the holes 46, or is raised with the bifurcated member 18 which is later laid back down, to the shoulder stop position as shown by FIGURE 2. In this position, it will be noted that the terminal end 48 of the intermediate support is disposed horizontally though the support member itself is slightly inclined. It should also be noted that the member provides its intermediate height support substantially over the swivel pin 24.

To obtain maximum height adjustment of the adapter 10, the bifurcated member 18 is raised causing, in turn, the intermediate member 20 to also be raised and flipped over to the position shown in FIGURE 3 wherein the terminal end 48 thereof is engaged in the receptive notches 28 in the extended end of the swivel block member. The stop shoulders 56 provided on the arms of the bifurcated member 18 serve to orient the intermediate support 20 for reception in the swivel block notches 28.

It will again be noted that the terminal end of this support, in this instance the bifurcated member 18, is horizontally disposed and that the weight received is distributed through its forked arms and the intermediate support 20 to the swivel block member 16. The inclination of the bifurcated member towards the intermediate support assures that it will remain in a shoulder blocked upright standing position.

FIGURES 4-8 show a lift frame adapter 70 which, as previously discussed, may be provided on the end of a lift frame member 72 or other base support member that can be extended or retracted on a lift frame arm. It includes a swivel block 74, bifurcated support member 76 and an intermediate support member 78.

The swivel block member 74 includes a pivot pin 80 which anchors it to the base support 72. It is made wider on one side or end than on the other and has the terminal ends of arms 82 and 84 of the bifurcated member 76 secured thereto on a pivot pin 86. The terminal end of the arms 88 and 90 of the intermediate support 78 are secured to the narrower end or side of the swivel block 74 by means of a pivot pin 92.

The intermediate support 78 nests within the bifurcated member 76, as before, but in this instance both support members are secured to the swivel block 74.

The side faces of the bridging part 94 of the bifurcated member 76 and of the intermediate support member 78, in their nested relation, are scored as before to provide a friction surface and the terminal end of each is undercut so that they will be horizontally disposed when erected.

Figure 6:
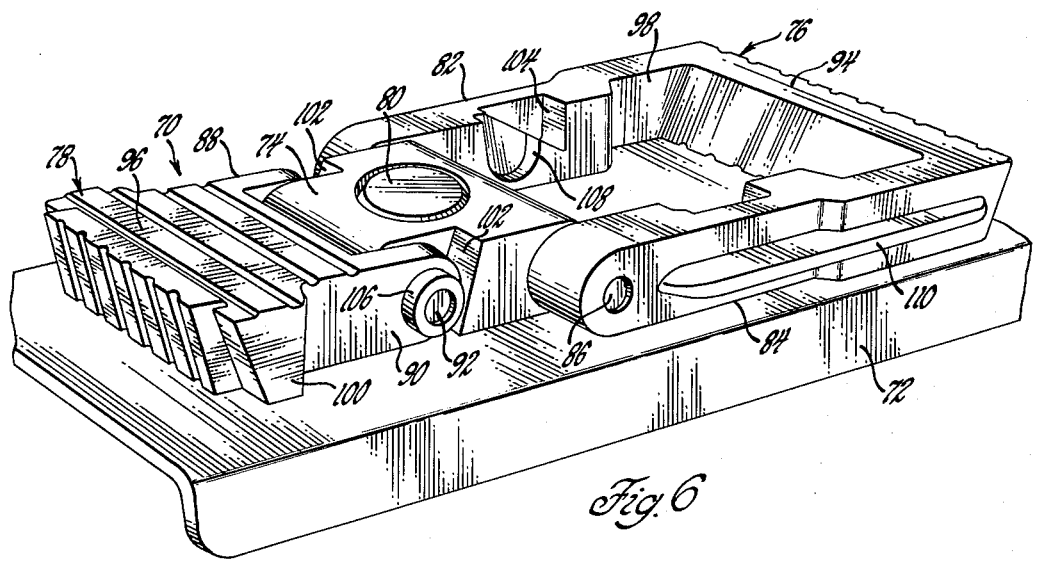
FIGURE 6 is a perspective view of the lift frame adapter shown by FIGURE 4 with one of the supports shown disposed in an intermediate position.

The intermediate support 78 includes an enlarged head 96, as before, which is received in a receptively larger recess 98 provided between the arms 82 and 84 of the bifurcated member 76. However, the recess 98 and the enlarged head of the intermediate support member are formed slightly different in this instance and in a manner which enables the bifurcated member 76 to be flipped over, as shown by FIGURE 6, without carrying the intermediate support member with it. The intermediate support member 78 still includes the stop shoulders 100, best shown in FIGURES 5-8, but they serve a different purpose as will be described later.

Between the narrower and wide ends or sides of the swivel block 74 are provided stop shoulders 102 which receive the intermediate support member 76 there against, when it is erected, and holds it in a slightly inclined but substantially upright standing position. As before, the arms 88 and 90 of the intermediate support member are proportioned so that the body of the support member rests on the swivel block 74 and obtains further shoulder support.

With the terminal ends of the bifurcated member 76 secured to the wide end or side of the swivel block 74, and the intermediate support 78 fitted between the arms a bifurcated member and pinned to the narrower end or side of the swivel block, it will be appreciated that this construction provide a more compact and neatly nested relation of parts than with the structure previously described.

In the use of the adpater 70, as before, the adapter parts in nested relation provide the low level support.

Figure 5:
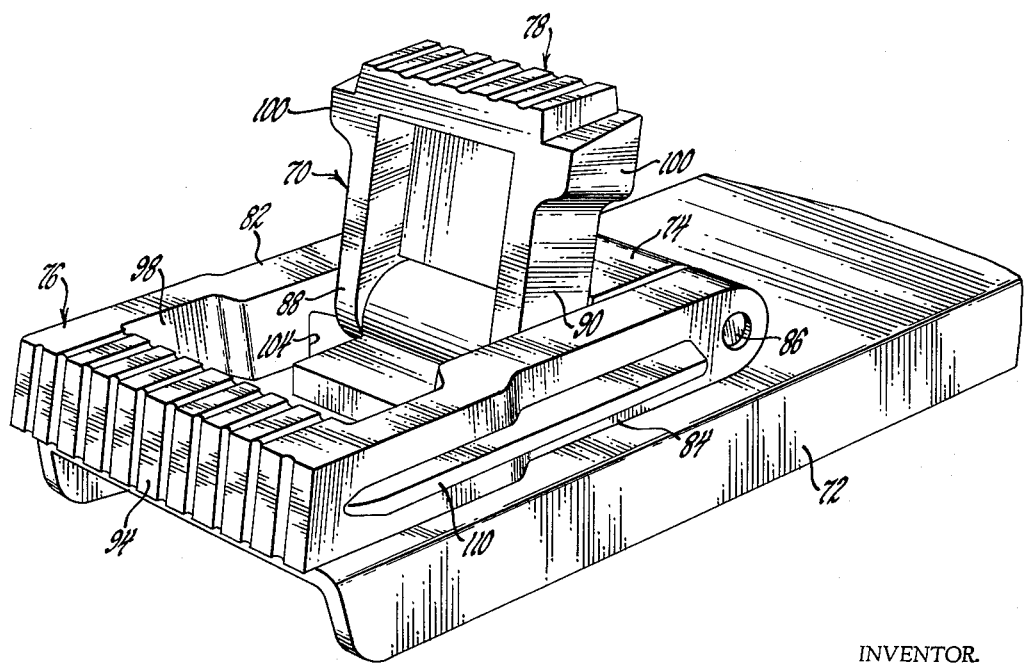
FIGURE 5 is a perspective view of the lift frame adapter shown by FIGURE 4 with one of the members disposed to provide an intermediate height support.

Intermediate height support is obtained by raising the intermediate support member 78 to its shoulder blocked upright support position, as shown by FIGURES 5 and 7. It wil be noted that this may be accomplished with the bifurcated member 76 in its nesting position or with it flipped over and extended out on the other side of the swivel block 74.

Full height support is obtained by raising the bifurcated member 76 into a shoulder blocked support position relative to the intermediate support 78. However, this requires that the bifurcated member be first disposed in the extended position shown by FIGURE 6 since the two supports swing on different axes and one cannot pass through the other except from the nested position.

Once the bifurcated member 76 is flipped over to its extended position on the other side of the swivel block 74, as shown by FIGURE 6, the intermediate support 78 is raised, as in FIGURE 7, and thereafter the bifurcated member is pivoted back into the support position shown by FIGURE 8.

The upright supported position of the bifurcated member 76 is obtained by engagement of the shoulder stops 100 of the intermediate support 78 in receptive shoulder stop notches 104 cut in the inside of the arms 82 and 84 of the bifurcated member. The notches 104 are formed to preclude passage of the shoulder stops 100 therethrough and for shoulder blocked upstanding support of the bifurcating member with the intermediate support disposed substantially in its own shoulder blocked upright support position.

In passing, it will be noted that the ends of the pivot pin 92 holding the intermediate support 78 engaged to the swivel block 74 include collar retainers or headed ends 106. Suitable recesses 108 are formed in the sides of the arms 82 and 84 of the bifurcated member, next adjacent the shoulder stop notches 104, to receive these extended ends and enable the close nested relation previously described. Other than in this respect, they serve no purpose.

Similarly, structural reinforcement ribs 10 are shown formed on the outer sides of the arms 82 and 84 of the bifurcated member to compensate for a loss of strength otherwise occasioned by the notches and recesses formed therein, and also serves as a lip or ledge which may be engaged by a forked or formed rod used to erect the adapter when disposed under a vehicle.

From the foregoing, it will be appreciated that both of the two embodiments shown and described depict a lift frame adapter which includes a minimum of parts, each of sturdy construction, readily assembled, and exceptionally easy to operate. Further, the variable height supports provided are each shoulder blocked to provide a solid support and so arranged that the collapse thereof in use is virtually impossible. In each instance, due consideration has been given the distribution of forces incident to supporting a weight and such forces have been concentrated near or through the connection to the lift arm on which the adapter is to be provided.

Without further discussion it should be obvious that numerous other variations, modifications and combinations are conceivable and within the scope of this invention.

Although two different embodiments have been specifically shown and described in detail, it will be appreciated that this has been done to illustrate the scope of the present invention and without intent to unnecessarily limit the invention thereto in any regard. Accordingly, such improvements, modifications and alterations have come to mind and are within the spirit of this invention and are not specifically excluded by the language of the hereinafter appended claims are to be considered as inclusive thereunder.

I claim:
1. A lift frame adapter, comprising:
a swivel block having a support member engaged thereto for movement therewith and pivotal movement to an upright standing position thereover,
an intermediate support pivotally mounted for shoulder-blocked free standing support against said swivel block and independent of said first mentioned support,
and said intermediate support being formed and positionable for engagement and support of said support member in the unright standing position thereof.
2. The lift frame adapter of claim 1,
said swivel block and first mentioned and intermediate supports being formed for flat folding nested engagement together providing a minimum height support.
3. The lift frame adapter of claim 2, said intermediate support being pivotally engaged to said first mentioned support and operable therewith.
4. The lift frame adapter of claim 1,
said intermediate support being pivotally connected to one of said swivel block and first mentioned support member and formed and disposed for shoulder engagement with the other thereof in the support of said first mentioned support member in said upright position.
5. The lift frame adapter of claim 4,
said intermediate support and first mentioned support member being pivotally mounted with respect to said swivel block member on opposite sides of the axis of rotation thereof.
6. A lift frame adapter, comprising:
a base member having a swivel block provided thereon and rotatable about a vertical axis,
a bifurcated member having the forked end thereof pivotally connected to the outer disposed sidewalls of said swivel block and adapted for upright high standing support thereover,
an intermediate support member nested within said bifurcated member and pivotally connected to the fork arms thereof,
said intermediate member being formed and disposed for shoulder blocked upright standing engagement with one of said swivel block and bifurcated member,
and said intermediate member being pivotal with said bifurcated member and engageable with said swivel block for shoulder blocked support of said bifurcated member in the upright high standing support thereof.
7. The lift frame adapter of claim 6:
said bifurcated member having the terminal ends of the fork arms thereof engaged to said swivel block and formed to provide shoulder stops for the support of said intermediate support thereagainst.
8. The lift frame adapter of claim 6,
said swivel block including laterally disposed ends and having one end thereof disposed for shoulder stop engagement with said intermediate support in the shoulder blocked standing support thereof,
said swivel block having the other laterally disposed end thereof formed to include a shoulder stop notch receptive of said intermediate support in the shoulder blocked standing support of said bifurcated member thereby.
9. The lift frame adapter of claim 6,
said bifurcated and intermedite support members being cooperatively formed to include means precluding the pivotal rotation of one thereof in other than one direction apart from the other thereof.
10. The lift frame adapter of claim 6,
said bifurcated and intermediate support members having at least one side face and the terminal ends of each thereof formed for frictional engagement with members to be supported thereon.
11. A lift frame adapter, comprising:
a base member having a swivel block provided thereon and rotatable about a vertical axis,
a bifurcated member having the forked end thereof pivotally connected to the outer disposed sides of said swivel block,
an intermediate support member nested within said bifurcated member and pivotally connected to said swivel block,
said intermediate support member and swivel block being cooperatively formed for shoulder blocked upright standing support of said intermediate support member,
and said bifurcated and intermediate support members being cooperatively formed for shoulder blocked upright standing support of said bifurcated member over said swivel block and intermediate support member.
12. The lift frame adapter of claim 11,
said bifurcated and intermediate support members being pivotally engaged to opposite ends of said swivel block.
13. The lift frame adapter of claim 12,
said bifurcated and intermediate support members being nestable together on only one side of said block.
14. The lift frame adapter of claim 11 and including,
cooperative means provided on said bifurcated and intermediate support members and requiring prepositioning of said bifurcating member apart from its nested position and
elevation of said intermediate support into a support position precedent the upright support of said bifurcated member.

References Cited by the Examiner
UNITED STATES PATENTS 2,949,978  8/1960  Halstead _____ 187—8.75
2,958,395  11/1960  Wallace _____ 187—8.75

SAMUEL F. COLEMAN, *Primary Examiner.*
ANDRES H. NIELSEN, *Examiner.*